Dec. 28, 1948.　　　A. W. ORR, JR　　　2,457,595
GAS TURBINE CONTROL

Filed July 22, 1946　　　　　　　　　　6 Sheets-Sheet 1

A.W. Orr Jr.
INVENTOR.

BY
Hanley M Udale
ATTORNEY

Dec. 28, 1948.  A. W. ORR, JR  2,457,595

GAS TURBINE CONTROL

Filed July 22, 1946

A. W. Orr Jr.
INVENTOR.

BY
ATTORNEY

Patented Dec. 28, 1948

2,457,595

UNITED STATES PATENT OFFICE 2,457,595

GAS TURBINE CONTROL

Andrew William Orr, Jr., Detroit, Mich., assignor to George M. Holley and Earl Holley Application July 22, 1946, Serial No. 685,520

18 Claims. (Cl. 170—135.71)

The object of this invention is to improve the control of a gas turbine. This control is specifically adapted to an airplane. It is also specifically adapted to jet propulsion but it is not limited to jet propulsion, as it may be applied to the control of the pitch of an ordinary propeller driven airplane in which the motive power is a gas turbine. It can also be applied to the control of a staticnary gas turbine.

The specific object of this invention is to maintain a fixed final temperature in the turbine entrance, the value of which can be selected manually. The theory of the invention is that the maximum turbine entrance temperature is equal to the temperature of the air entering the combustion chamber plus the rise in temperature in the combustion chamber. The latter depends on the fuel/air ratio. By measuring temperature indirectly the difficulties inherent in the direct measurement of high temperatures are avoided.

The control of the output of the gas turbine may be obtained by four alternative methods.

(a) By moving the conical element in and out. This varies the effect of jet propulsion. The temperature is controlled by holding the tail position so as to adjust the load and hence to adjust the output of the turbine. As the air flow increases the fuel/air ratio decreases and the temperature falls. As the air flow decreases the temperature rises. It is desirable from a thermodynamic point of view to maintain the temperature at the highest possible safe value. If the temperature control moves the tail control in, which means to a high load position, a higher temperature may result than may be desirable. The turbine speed may also tend to rise so that a centrifugal governor is provided which tends to supply less fuel so as to maintain the desired speed. The temperature and turbine speed are thus both maintained at the desired selected values.

(b) By varying the propeller pitch on a turbine driven propeller so that the temperature control regulates the pitch to maintain the selected inlet turbine temperature. This control of load operates in conjunction with the fuel flow which is controlled by a speed governor to maintain the desired speed. With this alternative construction instead of moving the tail element the propeller pitch is varied.

(c) By varying the propeller pitch with a conventional means. Specifically by manually controlling the speed of the governor which controls the propeller pitch. In this case there will be no governor controlling the fuel and there will instead be a manual selection of the desired turbine inlet temperature. The fuel will be controlled automatically to give this maximum combustion chamber temperature by regulating the fuel flow.

(d) Where there is no propeller a speed governor, responsive to the turbine speed, controls the position of the cone in the tail of the jet propulsion. This cone is moved in and out to control the speed of the turbine. As before, there is a manual control for the selected turbine inlet temperature and this device controls the fuel flow to give the selected temperature.

Figure 1:
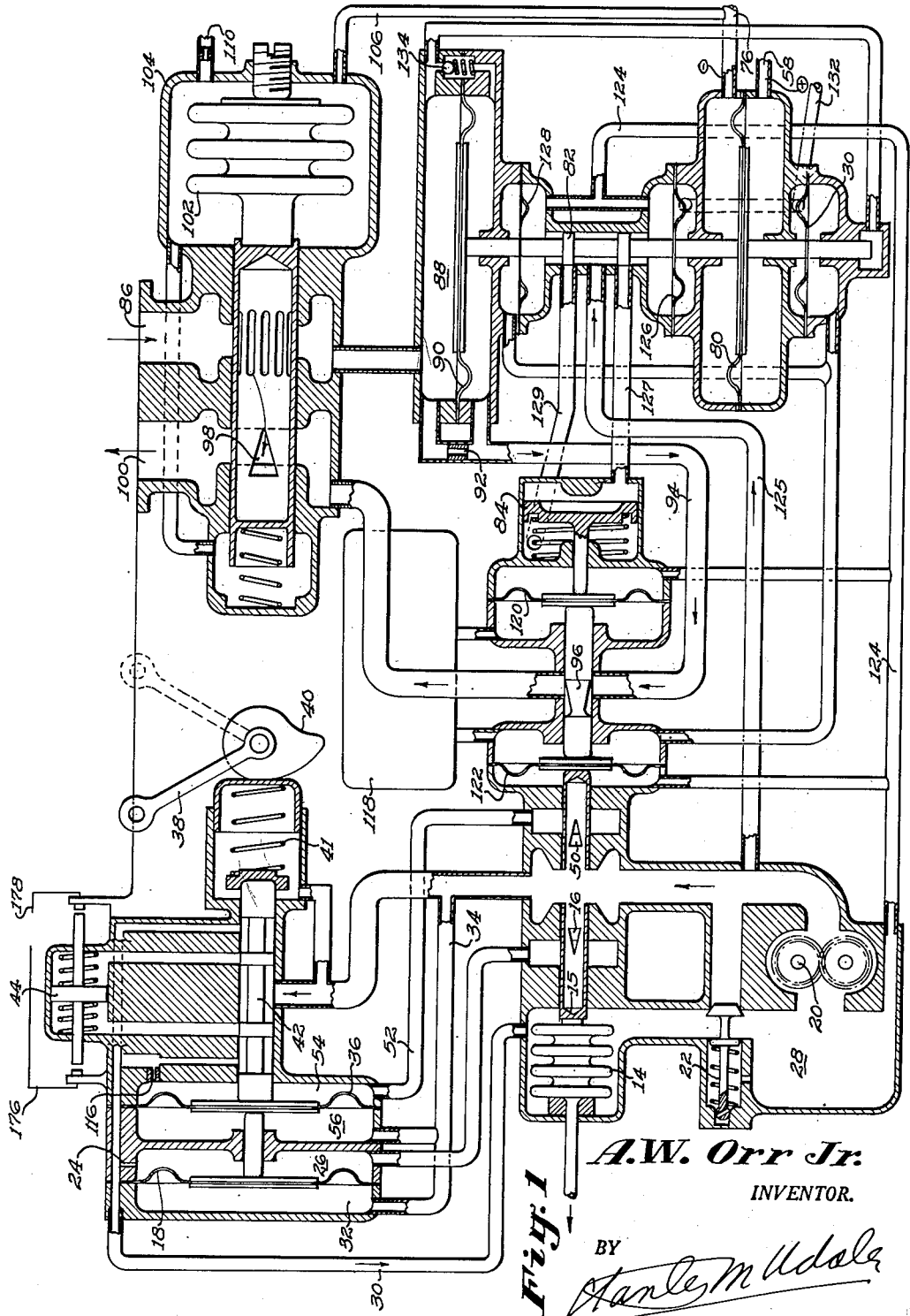
Fig. 1 shows diagrammatically the control which is the subject of this invention.
Figure 2:
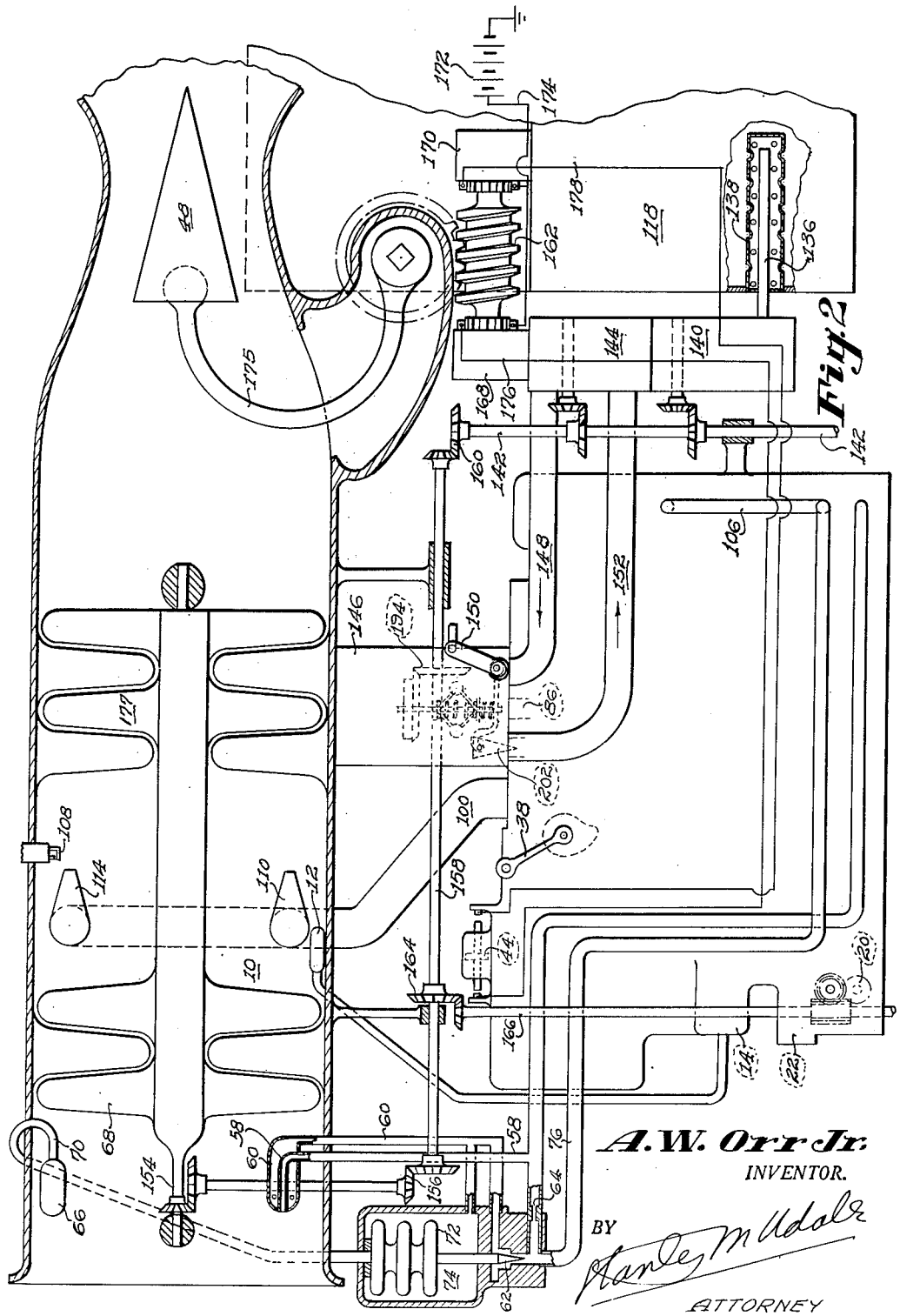
Fig. 2 shows the general arrangement of the control device applied to an ariplane driven by gas turbine and jet propulsion.

Referring to Figs. 1 and 2, 10 is the compressor outlet. As the temperature in the compressor outlet rises the element 12 becomes heated and causes the element 14 to move to the right. The tubular element 15 connected thereto is provided with a port 16 which regulates the pressure acting on the diaphragm 18. By this means the differential pressure acting on the diaphragm 18 is regulated by the temperature in the outlet 10 from the compressor 68. Meanwhile the turbine driven oil pump 20 is imposing a 20 pound per square inch pressure on the port 16 and this 20 pound per square inch is regulated by the load on the relief valve 22 which is spring loaded. There is a restriction 24 above the chamber 26 and to the right of the diaphragm 18. The restriction 24 is in series with the port 16. The downstream pressure on the restriction 24 is the pressure in the chamber 28 which is the inlet pressure leading to the oil pump 20. A pipe 30 connects the outlet from the restriction 24 with the chamber 28. The chamber 32, to the left of the diaphragm 18, is in free communication through the pipe 34 with the pressure side of the oil pump 20.

The diaphragm 36 is subjected to a corresponding pressure differential derived from the temperature rise in the burner chamber. The sum of these two temperatures, that is the burner chamber temperature rise and the compressor outlet temperature, is equal to the total temperature entering the turbine and this temperature at the turbine entrance is critical and determines the output and life at any given speed. In order to select a desired turbine inlet temperature a temperature selector lever 38 is manually operated. The cam 40, operated by the lever 38, engages with the spring 41 which in its turn engages with the servomotor valve 42. This servomotor valve 42 engages with the diaphragms 18 and 36. When an increase in temperature is desired the servomotor valve 42 is moved to the left by the clockwise rotation of the cam 40. This causes the element 44 to move to the right which causes the electrical circuit to move the tail element 48 in Fig. 2 to such a position that the temperature rises so as to bring the servomotor valve 42 back to its position of equilibrium in which it is shown. When the element 48 moves to the right the jet velocity increases and the temperature also increases, the cause of this being the increase in fuel/air ratio. The problem is therefore to make the diaphragm 36 in conjunction with the diaphragm 18 reflect the temperature in the combustion chamber exit.

The pressure acting on the diaphragm 36 is determined by the flow through the V-shaped port 50 up the pipe 52 into the chamber 54 out of the port 116 and along the pipe 30 back to the chamber 28. The pressure in the chamber 56, to the left of the diaphragm 36, is equal to the pressure in the chamber 32 to the left of the diaphragm 18. That is to say, it is equal to 20 pounds per square inch. Hence, it is necessary to make the V shaped port 50 move in response to changes in fuel/air ratio which is a measure of the rise in temperature in the combustion chamber. The amount of air that is flowing is determined by the Pitot tubes 58 and 60 in Fig. 2. A needle valve 62 controls the flow from the pipe 58 to the pipe 60 through the restriction 64. The needle valve 62 is connected to the thermometer bulb 66 located in the entrance to the compressor 68. Pipe 70 is connected to the bellows 72 which moves the needle 62. The chamber 74 surrounds the bellows 72 and is connected to the pipe 60. The pipe 76 is connected to the pipe 60 past the needle valve 62. By this means, referring to Fig. 1, the pressure on the diaphragm 80, which is in an upward direction, depends on the volume and temperature of air entering the compressor 68. The pressure difference derived from the Pitot tube 58–60 is thus imposed on the diaphragm 80 with a suitable correction for temperature. The servomotor valve 82 controls the position of the loaded piston 84 so that as the air flow falls the servomotor valve 82 descends and the piston 84 moves to the left because the pressure from the oil pump 20 is then transmitted through the pipe 125 past the servomotor valve 82 to the pipe 127 which transmits oil pressure to the right hand side of the piston 84. Meanwhile oil escapes from the left hand side of piston 84 through the pipe 129 to the return pipe 124. Fuel/air ratio depends on the relative air flow and fuel flow. Fuel flow originates in the passage 86 and a small portion of it flows into the chamber 88, above the fuel diaphragm 90, through the fuel restriction 92, through the pipe 94, past the valve 96, to the gas turbine through the pipe 100. In the position shown the port 98 is almost fully open and through it flows the major portion of the fuel. The main flow of fuel is from the pipe 86 through the port 98 to the pipe 100. The Pitot tube measures the air flow, and the pressure drop at the restriction 92 measures the fuel flow when the valve 96 is wide open. If the air flow is relatively less than the fuel flow the servomotor valve 82 moves down and the piston 84 moves to the left and the valve 96 moves to the left to restore the balance by decreasing the fuel flow through the bypass 94. In order to correct for the fact that air is a fluid which expands, whereas the expansion of kerosene is negligible, a barometric element 102 is added. The outer chamber surrounding the element 102 is 104 and is connected through the passage 106 with the suction side 76 of the Pitot tube. A small restriction 110, connected to the atmosphere, insures that there is a definite circulation of air in the chamber 104 surrounding 102.

The main volume of the fuel flows in at 86, through the port 98 to the outlet 100 leading to the combustion chamber. The drop across the metering fuel port 98 is the measure of the flow through the port 98. Hence the drop through the restriction 92, when the valve 96 is wide open, is a measure of the flow through the port 98. This is the leanest fuel/air ratio that will burn. If the valve 96 moves to the left the drop across 92 no longer reflects the flow through the port 98 but only a fraction of that drop. Hence the position of the valve 96 and therefore the position of the port 50 reflects the fuel/air ratio. Hence the cam 40 selects the maximum temperature by means of the servomotor valve 42 and the electrical connection. By this means the diaphragm 90 is balanced against the diaphragm 80. It follows, that the position of the valve 96 indicates the value of fuel/air ratio (see Fig. 2). It follows from this that any one position of the V shaped orifice 50 determines that there is a corresponding position for the valve 96. 50 is in series with the jet 116 so that 50 and 116 being in the oil system, the difference in pressure in the two sides of the diaphragm 36, that is to say in the chamber 54 to the right of the diaphragm 36 and chamber 56 to the left of diaphragm 36, reflects the rise in temperature due to combustion.

The fuel tank 118 is connected so that it imposes a low pressure on the diaphragm 120 and it also delivers a corresponding pressure on the diaphragm 122. These two pressures cancel out. One end of the valve 96 engages with the diaphragm 122. The left hand side of the diaphragm 122 is connected with the return oil pipe 124. The right hand side of the diaphragm 120 is connected with the return oil pipe 124. The lower side of the diaphragm 128 and the upper side of the diaphragm 126 is connected to the return oil pipe 124. The upper side of the diaphragm 128 is connected to the fuel tank 118. The upper side of the diaphragm 130 and the lower side of the diaphragm 126 are connected together and are also connected to the atmosphere through the pipe 132. Check valve 134, which is spring loaded, allows fuel to flow from the pressure side (88) of the diaphragm 90 to the low pressure side of the diaphragm 90 downstream of the restriction 92.

In Fig. 2 118 is the fuel tank, 136 is the outlet, 138 is the screen at the entrance to 136, 140 is the boost pump driven by the shaft 142, 144 is the high pressure pump also driven by the shaft 142 which delivers fuel to the centrifugally controlled governor chamber 146 through the pipe 148, the speed at which said governor responds being controlled by the manual control lever 150. The governor is driven by the bevel gear 194. By means of a speed selector lever 150 the turbine speed is controlled. The governor acts by returning a portion of the fuel through the bypass 152 to the inlet side of the pressure pump 144. The compressor 68 drives a pair of bevel gears 154 and the motion is transmitted to another pair of bevel gears 156. Shaft 158 is thus driven at less than the speed of the gas turbine. A pair of bevel gears 160 drives the boost pump 140 and the high pressure pump 144 by means of the shafts 142 and 158. The shaft 158 also drives the centrifugal device within the governor casing 146 by means of the bevel gear 194. The return valve 202, controlled by the governor inside the casing 146, controls the return of fuel through passage 152. The manual control lever 150 selects the desired turbine speed. The shaft 158, through a pair of bevel gears 164 and a shaft 166 drives an oil pump 20.

When the hydraulically operated servomotor 44 moves in either direction it energizes one of two electric motors 168—170. The electricity is provided from a storage battery 172 and a conductor 174 which delivers electricity to the two motors 168—170. The servomotor valve 42 determines which of the two conductors 176—178 will be grounded. The two electric motors 168—170 drive a shaft which carries a worm 162. One motor turns it clockwise and the other motor turns it anti-clockwise. The worm 162 is thus rotated and the arm 175 thus moves the cone 48 which regulates the flow of air through the compressor 68 and the turbine 177 and thus determines the temperature of the inlet to the gas turbine.

The fuel delivered by the governor mechanism 146 descends through the passage 86 and is discharged through the outlet 100 to the fuel nozzles 110—114 which delivers fuel past the ignition device 108.

The turbine inlet temperature selector lever 38 is shown on the outside of the casing containing the mechanism shown in Fig. 1.

Figure 3:
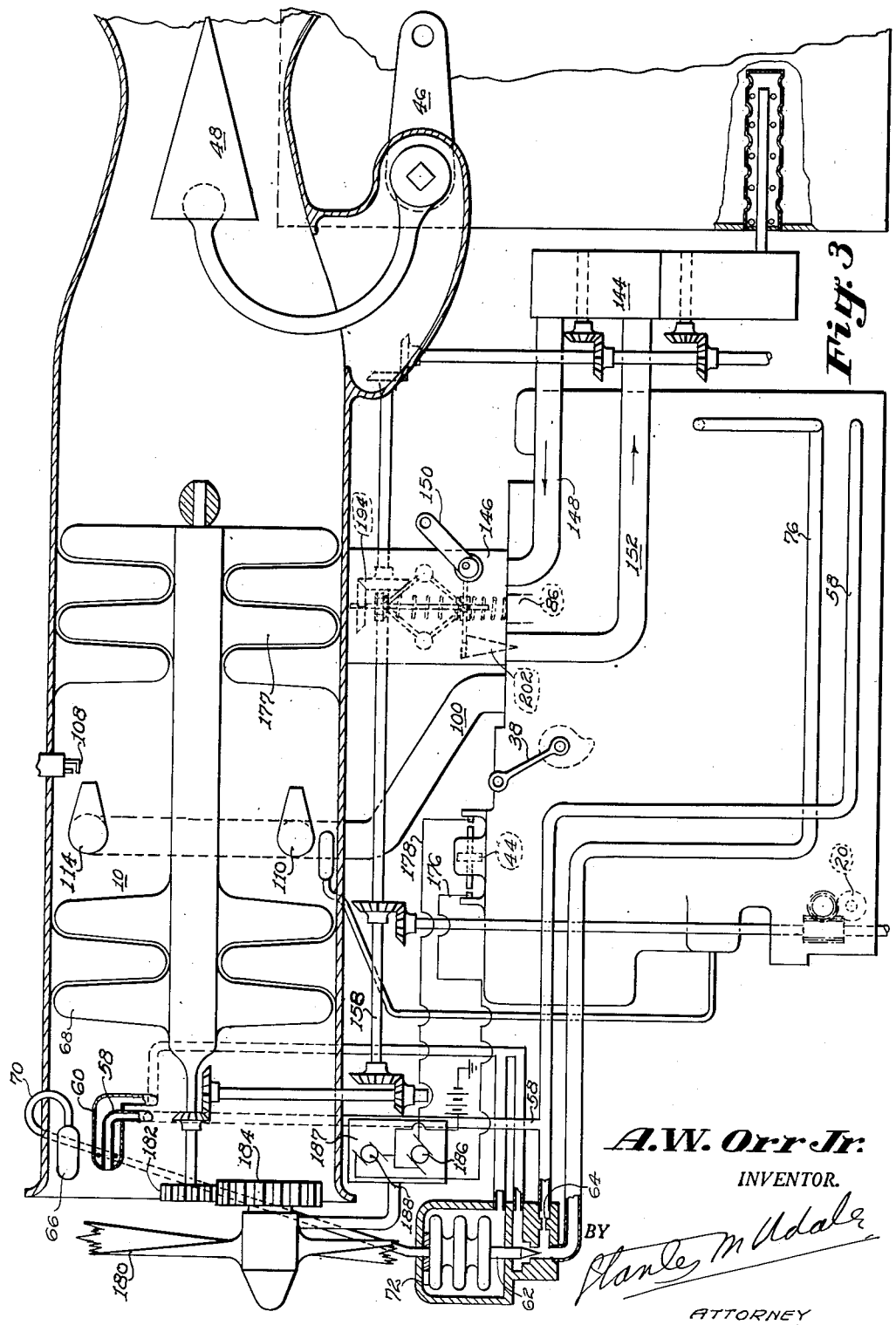
Fig. 3 shows the general arrangement of the control device applied to a propeller driven airplane with auxiliary jet propulsion.

Fig. 3 corresponds to Fig. 2 with this exception that the turbine 177 drives the propeller 180 by means of spur gears 182—184. The pitch of this propeller is varied by a mechanism contained in the box 187. This mechanism is controlled by the electric conductors 176—178 which are controlled by the movable element 44 (see Fig. 1). Two small electric motors 186—188 are controlled alternately by the electric conductors 176—178 so that as the temperature responsive element 44 moves to the left and right the two small electric motors 186—188 make a corresponding adjustment to the propeller 180. The pitch of the propeller is controlled by a well known hydraulic mechanism controlled by the motors 186—188. As in Fig. 2 a shaft 158 rotated by the turbine 177 operates the governor by bevel gears 194 which operates the fuel governor inside the casing 146. This governor mechanism 146 returns excess fuel past the valve 202 through the pipe 152 to the entrance of the high pressure pump 144. The governor mechanism 146 discharges fuel through the passage 86 and this fuel is in its turn discharged through the outlet 100 to the jets 114—110 in the combustion chamber and this fuel is ignited by the ignition device 108. The position of the cone 48 is fixed by the position of the lever 46.

The turbine inlet temperature selector lever 38 is shown on the outside which corresponds to the lever 38 shown in Fig. 1.

Figure 4:
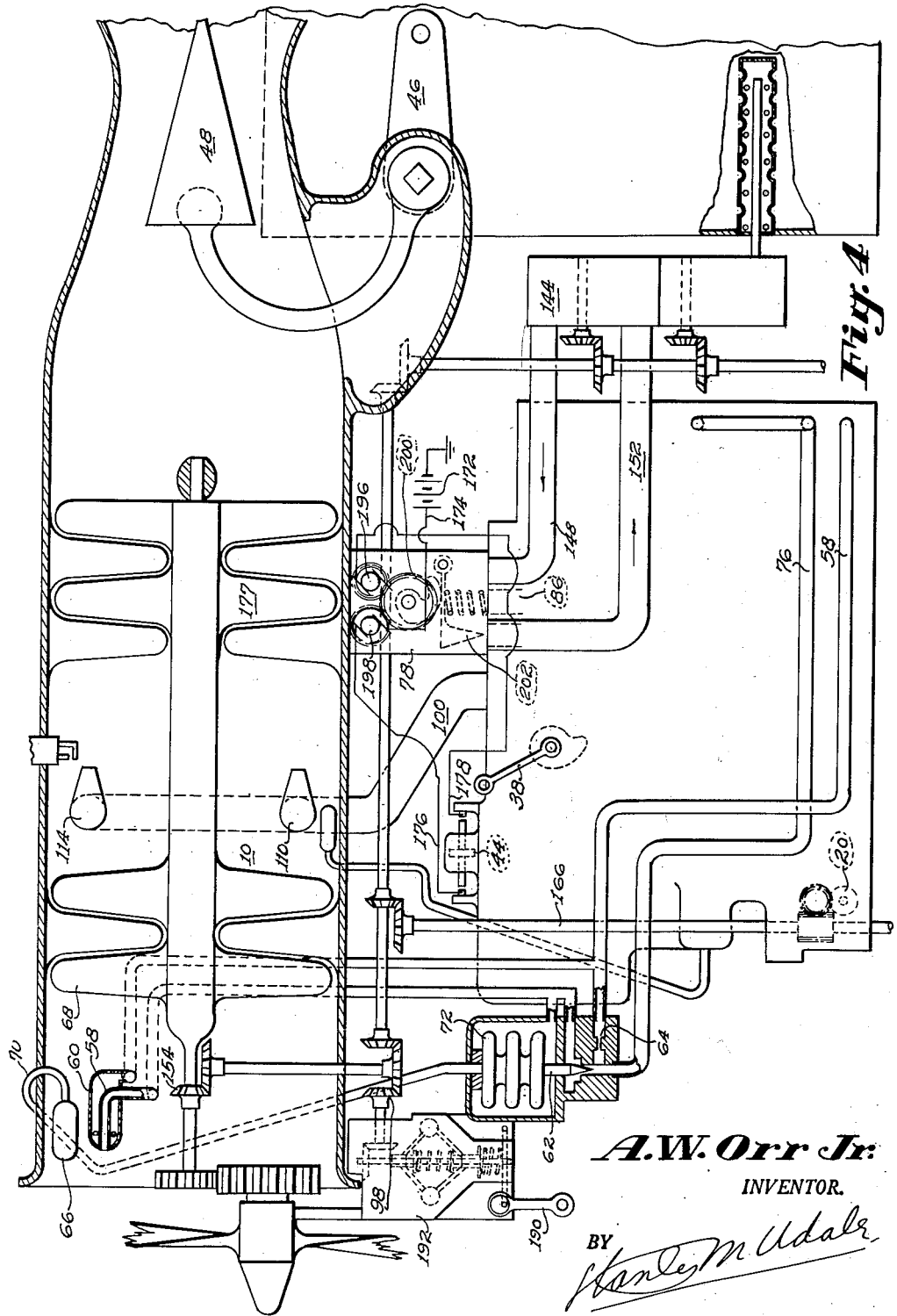
Fig. 4 shows a similar construction to Fig. 3 with an alternative application of the control mechanism shown in Fig. 1.

Fig. 4 is similar to Fig. 3 with the exception that the hydraulic mechanism for controlling the pitch of the propeller is manually controlled by the lever 190, the mechanism being contained inside the box 192. The shaft 166 is driven by the gears 154 which drive the governor inside the casing 192 and this governor controls the pitch of the propeller in a well known manner. The speed at which the governor controls the pitch is determined by the position of the manually controlled lever 190. In this case the control of the fuel from the pump 144 is controlled by means of the movable element 44 and the electrical conductors 176—178 which alternately cause the small motors 196—198 to rotate the cam 200 clockwise and anti-clockwise and thus causes the valve 202 to open and close. The mechanism is contained in the casing 78. As before a storage battery 172 and a conductor 174 provides the motive power for the small electric motors 196—198. The valve 202 delivers the excess fuel to the outlet passage 152. The main body of fuel is delivered through the passage 86 through the control device and then to the outlet 100 to the burners 114—110 to the gas turbine 177. The turbine inlet temperature selector lever 38 is shown on the outside which corresponds to the lever 38 in Fig. 1. The position of the cone 48 is fixed by the lever 46. The governor is driven by bevel gears 154.

Figure 5:
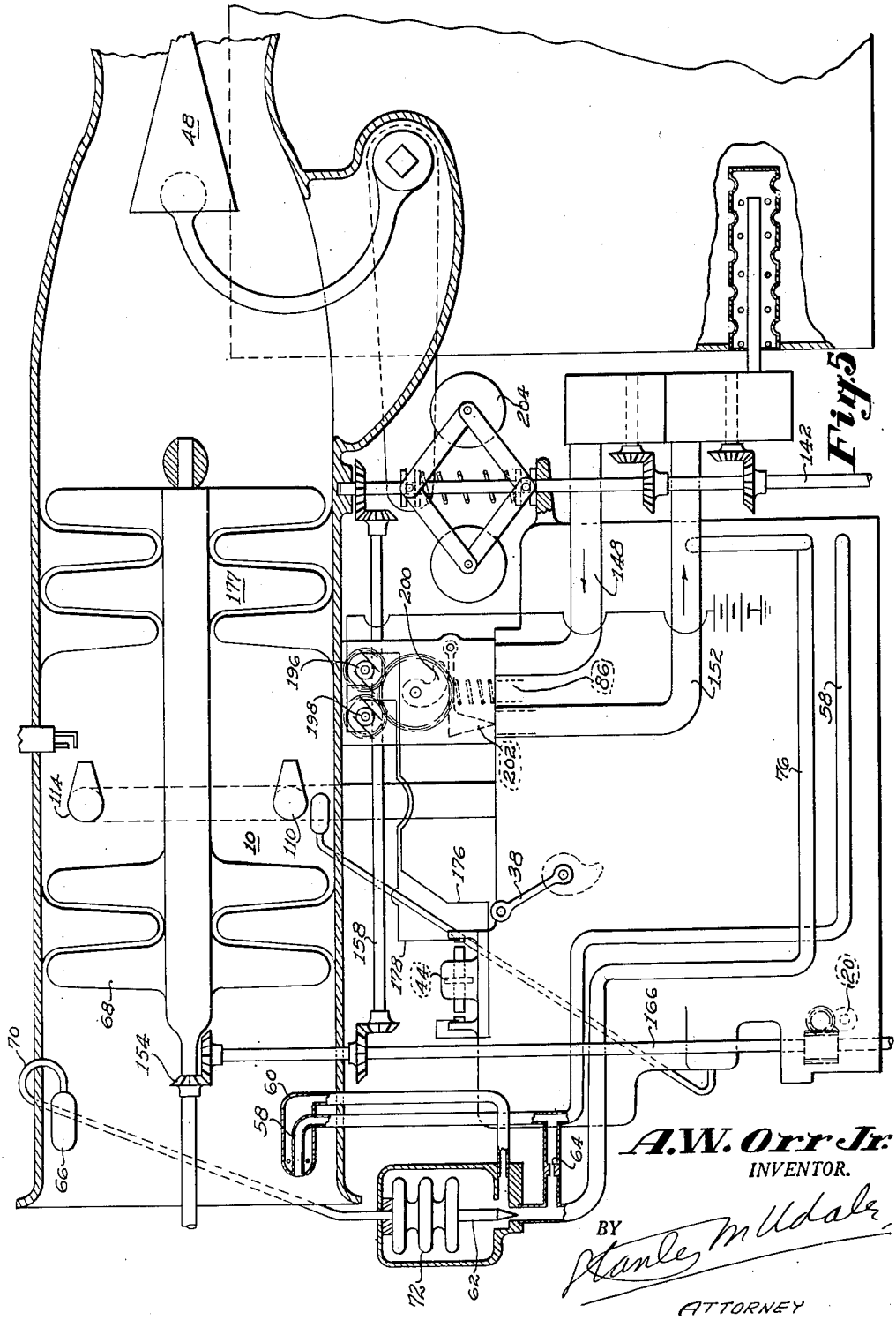
Fig. 5 shows a general arrangement of the control device applied to an airplane driven by a gas turbine and by jet propulsion. This is an alternative application of the control mechanism shown in Fig. 1.

Fig. 5 is similar to Fig. 2 with the exception that the cone 48, which was adjusted by the temperature control means in Fig. 2 is adjusted by the centrifugal means in Fig. 5. This time it is adjusted by a centrifugal governor 204 which is driven by the shaft 142 which shaft in its turn is driven by the shaft 166 which is driven by the gears 154 mounted on the compressor 68. The control of the fuel is similar to that shown and described in Fig. 4. In this case there is no propeller. The turbine inlet temperature selector lever 38 is shown on the outside which corresponds to the lever 38 in Fig. 1.

Figure 6:
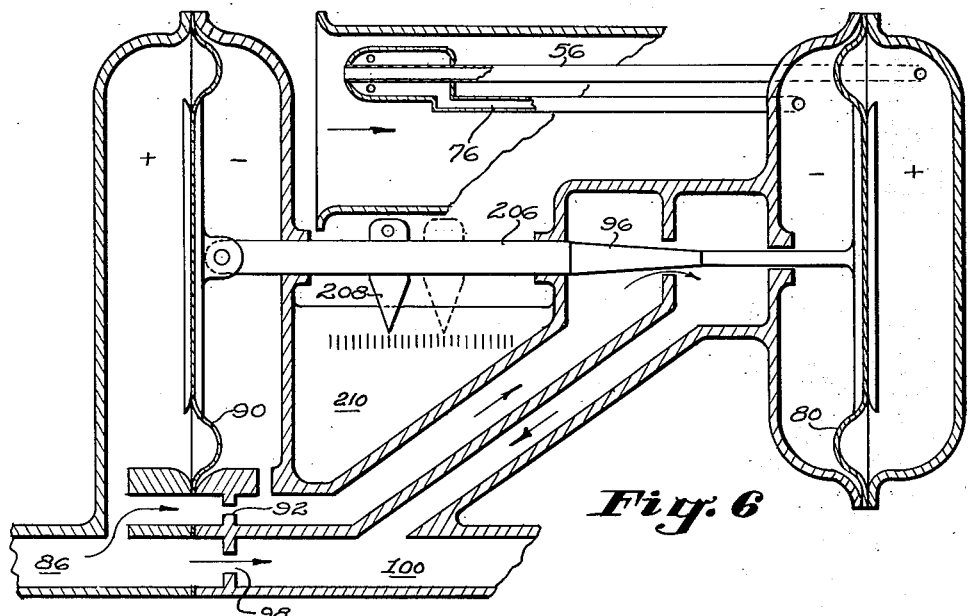
Fig. 6 is a diagrammatic illustration of the device responsive to fuel/air ratio.

Fig. 6 is a diagrammatic representation of the fuel/air ratio indicating mechanism corresponding to the right hand side of Fig. 1. In this Fig. 6 the fuel diaphragm 90 is shown in a vertical position connected to a link 206 which carries a pointer 208 which moves over a scale 210 to indicate fuel/air ratio. The left hand side of the fuel diaphragm 90 is subjected to the pressure in the fuel entrance 86. The right hand side of the diaphragm is subjected to the pressure in the outlet 100 downstream from the main fuel restriction 98, as modified by the restriction 92 and the valve 96.

The valve 96 is also connected to the air diaphragm 80 which is responsive through the pipe 56 to the impact side of the Pitot tube. The suction side is connected through the pipe 76. As the fuel/air ratio falls the valve 96 moves to establish equilibrium between the diaphragms 80 and 90.

Figure 7:
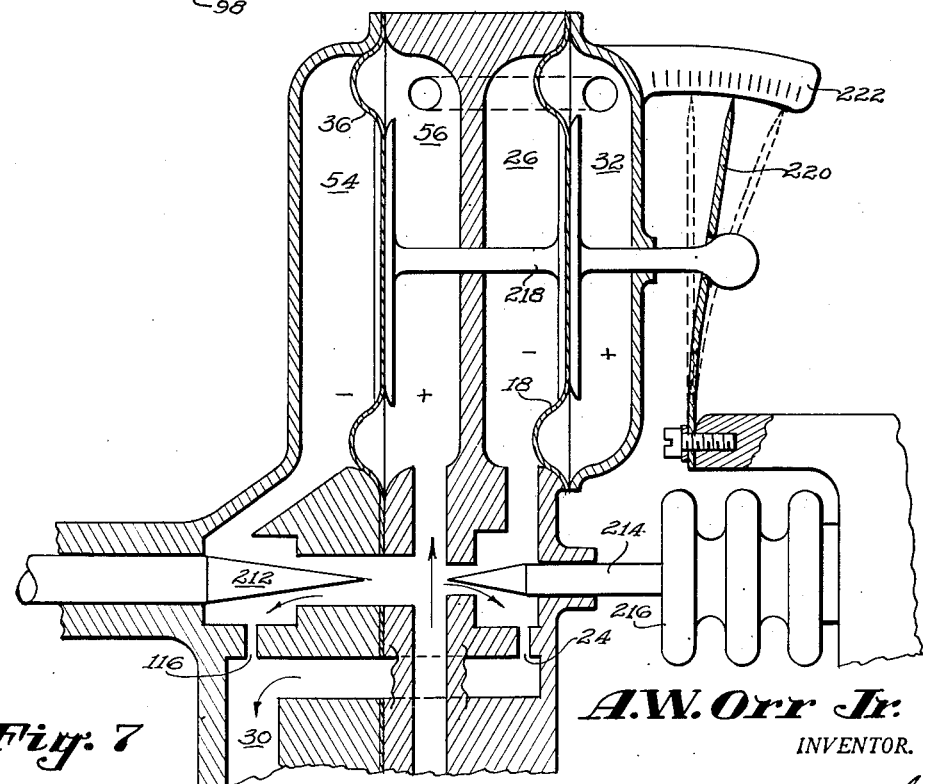
Fig. 7 is a diagrammatic drawing of the means that indicate turbine inlet temperature.

Fig. 7 shows diagrammatically the means for indicating turbine inlet temperature corresponding to the left hand side of Fig. 1. Valve 212 corresponds to the variable port 50 and imposes a variable pressure in the chamber 54 to the left of the diaphragm 36. The pressure to the right of the diaphragm 36 and to the right of the diaphragm 18 is that of the 20 pounds per square inch pressure imposed by the oil pump 20 not shown. The valve 212 regulates the pressure on the diaphragm 36 by reason of the restriction 116. The regulation of the pressure in the chamber 26, to the left of the diaphragm 18, is controlled by the valve 214 which corresponds to the variable port 16. The temperature responsive element 216 corresponds to the temperature responsive element 14 in Fig. 1. The regulation of this pressure is by reason of the restriction 24. The restrictions 116 and 24 are connected through a pipe 30 with the low pressure side of the oil pump 20 not shown. The pressure on the diaphragms 36 and 18 is resisted by a spring 220 by means of the rod 218. The scale 222 indicates the turbine inlet temperature by adding together the effect of variations in the temperature of the air entering the combustion chamber and the rise in the combustion chamber temperature due to the fuel/air ratio which determines the position of the valve 212.

Operation

Assuming that the gas turbine has just been started then the compressor 68 raises the temperature in the bulb 12 and the fuel/air ratio is decreased automatically as follows: The element 15 responds to the expansion of the element 14, and the port 16 is moved to the right so that the area of the port 16 is decreased. The pressure in the chamber 26 is thus decreased and the diaphragm 18 is thus moved to the right. The servomotor valve 42 is moved to the right against the influence of the spring 41. A 20 pound per square inch pressure is thus applied to the right hand side of the element 44 which grounds the electrical conductor to the left which is conductor 176 of Figs. 1, 2, 3, 4, and 5. This reduces the temperature by reducing the fuel flow, as described hereafter, relative to the air flow. This change in fuel/air ratio causes the servomotor valve 82 to rise. This rise of the servomotor valve 82 causes the piston 84 to move to the right, which moves the valve 96 to the right which increases the flow at the bypass 94 which increases the pressure drop at the fuel restriction 92. This restores equilibrium and moves the servomotor valve 82 back into the neutral position in which it is shown. Meanwhile the port 50 has moved to the right increasing the area of the port 50 which raises the pressure in the chamber 54 which restores the servomotor valve 42 to the neutral position in which it is shown.

If the lever 38 is moved clockwise the servomotor valve 42 is moved to the left, the element 44 is moved to the right, the electrical conductor 178 is grounded and the controls are moved so as to increase the fuel flow relative to the air flow. This causes the servomotor valve 82 to descend which causes the piston 84 to move to the left and the valve 96 to move towards the closed position and this causes the port 50 to move towards the closed position also.

The pressure in chamber 54 falls so that the servomotor valve 42 moves to the right and restores the servomotor valve 42 to the neutral position in which it is shown. The compression of the spring 41 varies with every position of the cam 40. Hence, with every position of the cam 40 there is a definite value to the sum of fuel/air ratio and compression outlet temperature. Now turbine inlet temperature is equal to the compressor air temperature plus the rise in temperature in the combustion chamber. This rise in temperature is a simple function of the fuel/air ratio. All attempts to rely on thermocouples and thermostats at the temperatures of 1200°, 1400°, 1600° and 1800° F. have been generally unsatisfactory.

As the altitude varies the barometric element 102 expands and the port 98 is shifted to the left at high altitudes thus being reduced in area so that a given flow of fuel at altitude produces a greater drop in pressure and therefore calls for a greater drop in pressure to act on the air diaphragm 80. This detail is necessary to maintain constant fuel/air ratio at altitude for a fixed position of cam 40 and a fixed temperature in the compressor outlet 10.

In Fig. 2 the temperature control is obtained from the two electrical conductors 176—178. As the element 44 moves to the right and left, as thus described, it causes the electric motors 168—170 to rotate. The worm 162 is thus turned in opposite directions. The cone 48 is thus moved in and out of the outlet from the gas turbine. When it moves to the right the temperature rises and when it moves to the left the temperature falls. Meanwhile it is necessary to limit the top speed of the compressor turbine unit 68—177. This is accomplished by the gear wheels 194 which rotate at a speed proportional to the speed of the turbine. A centrifugal governor contained in the casing 146 rotates and allows fuel to escape from the governor casing 146 to the fuel return outlet 152 past the return valve 202.

Fuel is supplied from the tank 118, past the screen 138, through the passage 136 to the boost pump 140 to the high pressure pump 144, which delivers fuel through the passage 148, to the governor casing 146. The speed at which the governor is effective is determined by the regulator lever 150, which in this case is manually controlled. The manual control lever 38 and the manual control lever 150 are thus available for selecting the safe maximum temperature and the safe maximum speed.

In Fig. 3 the gas turbine is arranged to drive a variable pitch propeller through a pair of spur gears 182—184. In this case the pitch control device is contained in the housing 187 which contains two small electric motors 186—188. 188 is connected to the conductor 176 which is grounded when the element 44 moves to the left. When the element 44 moves to the right the conductor 178 is grounded and the small motor 186 is thus operated. The variations in the pitch of the propeller 180 thus controls the temperature as selected by the position of the lever 38. As before the centrifugal governor, contained in the casing 146, and driven by the spur gears 194, controls the escape of the fuel through the return passage 152 past the return valve 202. The speed and load of the propeller driven gas turbine is thus controlled, at the temperature selected by the position of the lever 38. The speed at the position of 38 is determined by the position of the lever 150. The cone 48 is adjusted manually and is held in a fixed position by the lever 46.

In Fig. 4 which is similar to Fig. 3 the variable pitch propeller 180 is controlled by a centrifugal governor contained in the casing 192. This centrifugal governor is driven by means of the bevel gears 98, which are driven from the turbine by the gears 154. The manually controlled lever 190 determines the speed directly and indirectly and it determines the pitch of the propeller in a well known manner. The temperature of the combustion chamber is then controlled by the fuel flow. The casing 78 contains the two small electric motors 196—198 which are alternately energized whenever the element 44 moves to the right or left to ground one of the conductors 176—178. The cam 200 is thus rotated clockwise and anticlockwise to raise and lower the valve 202 and to vary the return of the fuel from the casing 78 through the pipe 152 to the high pressure fuel pump 144. As in Fig. 3 cone element 48 is held in a fixed position by the lever 46.

Fig. 5 like Fig. 2 has no propeller as it depends purely on jet propulsion. In this case the position of the cone 48 is determined by a centrifugal governor 204 driven by the shaft 142, which shaft is driven by the shaft 158, which shaft is driven by the shaft 166, which shaft is driven by the gas turbine 68 through the bevel gears 154. Actually the servomotor would be used for the control of the cone 48 but this servomotor has been omitted for the sake of simplicity. In this case, as in Fig. 4, the valve 202 is controlled by the cam 200 which determines the return flow through the pipe 152 and the position of the valve 200 is determined by the element 44 as described above. As before the lever 38 thus determines the temperature through the gas turbine 176, the speed being determined by the position of the cone 48 which is controlled by the governor 204.

What I claim is:

1. A temperature control device for an air compressor connected to a gas turbine having a combustion chamber between the compressor and the turbine, comprising a fuel entrance to said control device, a fuel exit, a fuel restriction therebetween, a bypass around said fuel restriction, a second fuel restriction located in said bypass, a fuel diaphragm responsive to the drop in pressure at said second restriction, an air entrance to said air compressor, differential pressure means in said air entrance responsive to the air flow, an air diaphragm responsive to said air differential pressure, a third fuel restriction in series with said second fuel restriction, a valve in said third fuel restriction, means connecting said valve to both of said diaphragms so that an increase in air flow tends to open said valve and an increase in fuel flow tends to close said valve, means responsive to the temperature of the compressed air entering said combustion chamber to vary the inlet temperature of said gas turbine, additional means responsive to the position of said valve to jointly control with the first mentioned means the inlet temperature of said gas turbine.

2. A device as set forth in claim 1 in which there is a conical outlet jet leading from the gas turbine, a cone therein, means for moving said cone to vary the load on said gas turbine and the load and speed of said gas turbine, gas turbine speed responsive means adapted to control the position of said cone so as to regulate the speed of the turbine, means whereby said temperature control means are adapted to control the quantity of fuel supplied to the gas turbine to limit the temperature of the gas striking the turbine blades.

3. A device as set forth in claim 1 in which the gas turbine drives a variable pitch propeller and in which the temperature control means controls the gas turbine temperature by varying the pitch of said propeller, gas turbine speed responsive means which are adapted to control the fuel supply.

4. A device as set forth in claim 1 in which the gas turbine drives a variable pitch propeller, a speed responsive governor for said variable pitch propeller to regulate the turbine speed and in which there are means for controlling the supply of fuel connected to said temperature control means.

5. A temperature control device for an air compressor connected to a gas turbine having a combustion chamber between the compressor and the turbine comprising a fuel entrance to said control device, a fuel exit, a fuel restriction therebetween, a bypass around said fuel restriction, a second fuel restriction located in said bypass, a fuel diaphragm responsive to the drop in pressure at said second restriction, an air entrance to said air compressor, differential pressure means in said air entrance responsive to the air flow, an air diaphragm responsive to said air differential pressure, a third fuel restriction in series with said second fuel restriction, a valve in said third fuel restriction, means connecting said valve to both of said diaphragms so that an increase in air flow tends to open said valve and an increase in fuel flow tends to close said valve, means responsive to the position of said valve to control the inlet temperature of said gas turbine.

6. A device as set forth in claim 5 in which there is a conical outlet jet leading from the gas turbine, a cone therein, means for moving said cone to vary the load on said gas turbine and the load and speed of said gas turbine, gas turbine speed responsive means adapted to control the position of said cone so as to regulate the speed of the turbine, means whereby said temperature control means are adapted to control the quantity of fuel supplied to the gas turbine to limit the temperature of the gas striking the turbine blades.

7. A device as set forth in claim 5 in which the gas turbine drives a variable pitch propeller and in which the temperature control means controls the gas turbine temperature by varying the pitch of said propeller, gas turbine speed responsive means which are adapted to control the fuel supply.

8. A device as set forth in claim 5 in which the gas turbine drives a variable pitch propeller, a speed responsive governor for said variable pitch propeller to regulate the turbine speed and in which there are means for controlling the supply of fuel connected to said temperature control means.

9. A temperature control device for an air compressor connected to a gas turbine having a combustion chamber between the compressor and the turbine comprising a fuel entrance to said control device, a fuel exit, a fuel restriction therebetween, a bypass around said fuel restriction, a second restriction in said bypass, a fuel diaphragm responsive to the drop in pressure at said second restriction, an air diaphragm responsive to the air flow through said gas turbine, a third restriction in series with said second restriction, a valve in said restriction, means connecting said valve to both diaphragms so that an increase in air flow tends to open said valve and an increase in fuel flow tends to close said valve, barometric means tending to close said first mentioned restriction at altitude, means responsive to the temperature of the air entering the combustion chamber of said gas turbine and to the position of said valve for jointly controlling the temperature of the gases issuing from the combustion chamber of said gas turbine just before they strike the blades of the gas turbine.

10. A device as set forth in claim 9 in which there is a conical outlet jet leading from the gas turbine, a cone therein, means for moving said cone to vary the load on said gas turbine and the load and speed of said gas turbine, gas turbine speed responsive means adapted to control the position of said cone so as to regulate the speed of the turbine, means whereby said temperature control means are adapted to control the quantity of fuel supplied to the gas turbine to limit the temperature of the gas striking the turbine blades.

11. A device as set forth in claim 9 in which the gas turbine drives a variable pitch propeller and in which the temperature control means controls the gas turbine temperature by varying the pitch of said propeller, gas turbine speed responsive means which are adapted to control the fuel supply.

12. A devise as set forth in claim 9 in which the gas turbine drives a variable pitch propeller, a speed responsive governor for said variable pitch propeller to regulate the turbine speed and in which there are means for controlling the supply of fuel connected to said temperature control means.

13. A temperature control device for an air compressor connected to a gas turbine having a combustion chamber between the compressor and the turbine comprising a fuel entrance to said control device, a fuel exit, a fuel restriction therebetween, a bypass around said fuel restriction, a second restriction in said bypass, a fuel diaphragm responsive to the drop in pressure at said second restriction, an air diaphragm responsive to the air flow through said gas turbine, a third restriction in series with said second restriction, a valve in said restriction, means connecting said valve to both diaphragms so that an increase in air flow tends to open said valve and an increase in fuel flow tends to close said valve, barometric means tending to close said first mentioned restriction at altitude, means responsive to the position of said valve to control the inlet temperature of said gas turbine.

14. A device as set forth in claim 13 in which there is a conical outlet jet leading from the gas turbine, a cone therein, means for moving said cone to vary the load on said gas turbine and the load and speed of said gas turbine, gas turbine speed responsive means adapted to control the position of said cone so as to regulate the speed of the turbine, means whereby said temperature control means are adapted to control the quantity of fuel supplied to the gas turbine to limit the temperature of the gas striking the turbine blades.

15. A device as set forth in claim 13 in which the gas turbine drives a variable pitch propeller and in which the temperature control means controls the gas turbine temperature by varying the pitch of said propeller, gas turbine speed responsive means which are adapted to control the fuel supply.

16. A device as set forth in claim 13 in which the gas turbine drives a variable pitch propeller, a speed responsive governor for said variable pitch propeller to regulate the turbine speed and in which there are means for controlling the supply of fuel connected to said temperature control means.

17. In a gas turbine having a combustion chamber, fuel and air supply conduits, air flow responsive means located in said air conduit, a restriction in said fuel conduits, two diaphragms responsive one to the air flow and one to the fuel flow arranged so as to oppose each other, automatic balancing means therefor connected to both of the two diaphragms and consisting of a valve which reduces the effect of the fuel pressure drop at said restriction, the position of said valve thus reflecting the fuel/air ratio, means responsive to the temperature of the air entering the combustion chamber, said means being coupled to the balancing means so that some function of fuel to air ratio is added to said means responsive to the temperature of the air entering the combustion chamber, manual means for selecting the value of this sum, automatic means responsive to said selected sum for varying the air flow relative to the fuel flow so as to give the said sum the value selected.

18. In a gas turbine having a combustion chamber, fuel and air supplies therefor together with opposing air and fuel flow responsive means, means responsive to the unbalance between the opposing fuel and air responsive means adapted to vary the effect of the fuel flow so that the fuel and air flow responsive means may balance each other, automatic means responsive to the position of said balancing means for varying the air flow, yielding means opposing the said automatic means, a manually operated cam acting on said yielding means so as to select the desired fuel/air ratio in said combustion chamber.

ANDREW WILLIAM ORR, Jr.

REFERENCES CITED

The following references are of record in the file of this patent:

UNITED STATES PATENTS

| Number | Name | Date |
| --- | --- | --- |
| 2,306,953 | Jung | Dec. 29, 1942 |